Patented Aug. 31, 1937

2,091,886

UNITED STATES PATENT OFFICE 2,091,886

EMULSIFYING AGENTS

William F. Schanzle, Cincinnati, and Albert S. Richardson, Wyoming, Ohio, assignors to The Procter & Gamble Company, Cincinnati, Ohio, a corporation of Ohio No Drawing. Application August 7, 1929, Serial No. 384,240

9 Claims. (Cl. 252—1)

The object of our invention is to provide a process for making and a composition of matter which has the usual plasticizing and other physical properties of a wax, and also has in high degree the valuable property of stabilizing intimate mixtures of water and oil.

It has been known for some years that the emulsification of water in oil is favored by the presence of mono- and diglycerides, which may collectively be termed superglycerinated fat. However, as far as we are aware, this knowledge has not been put to any practical use, the reason for this being in the incomplete knowledge heretofore available concerning the proper choice of superglycerinated fat and the proper manner of using it.

Superglycerinated fat, which is liquid or completely soluble in the oil phase, when water and oil are mixed, promotes the formation of an emulsion of the distinctive water-in-oil type. If, on the other hand, the superglycerinated fat is at least in substantial part present as solid in the mixture, the resulting plasticity greatly favors stability, but the capacity of the superglycerinated fat for dispersing water in oil is considerably diminished. Into a mixture of mineral oil and, for example, molten monostearin, there may be finely dispersed with only moderate agitation a weight of water about ten times that of the monostearin; on cooling the phases become partly inverted and separation of water is likely to occur in spite of a favorable plastic condition of the mixture.

Alternate warming and cooling over the range of normal variation of atmospheric temperature is especially likely to promote the separation of such a mixture as that just described.

In general, neither the distinctive water-in-oil emulsion stabilized by liquid superglycerinated fat nor the more complex mixture of water and oil stabilized by solid superglycerinated fat possesses the degree of stability ordinarily required of commercial products.

It is the object of our invention to overcome the disadvantages heretofore enumerated. This we propose to accomplish by the use of a small amount of soap in conjunction with a superglycerinated fat containing a sufficient proportion of solids to possess a wax-like texture. In our use of the terms superglycerinated fat in this specification, and the claims which follow, we refer to fat mixtures having a preponderant proportion of mono and/or diglycerides as contrasted with and distinguished from the ordinary fat having a preponderance of triglycerides, or to triglycerides having glycerine added thereto as for example, in accordance with the following equation:

$$2C_3H_5(OH)_3 + C_3H_5(O-CO-R)_3 = 3C_3H_5(OH)_2O-CO-R$$

wherein R represents an alkyl radical contained in a fatty acid of high molecular weight. For the preparation of the superglycerinated fat, we have found that commercial stearic acid and hydrogenated fat provide especially desirable sources of the required fatty acids. By "hydrogenated fat" as used herein and in the claims we mean any hydrogenated fat or fatty oil. Preferably, there should be incorporated at least ½% soap in the solid or plastic superglycerinated fat, but even a smaller percentage of soap has distinctive merit. Above 1%, some additional advantage may be gained by the further addition of soap, but such advantage is not proportional to the increased soap content. The soap content of the synthetic wax or emulsifying agent may be increased without detriment up to a maximum which is not sharply defined but is in the neighborhood of 15%, above which increasing amounts of soap are as likely to be harmful as helpful. Hence we prefer to use a maximum of about 10% soap in our synthetic wax or emulsifying agent, although even an amount above 15% produces a decidedly beneficial effect as compared with no soap at all.

We prefer ordinarily to use sodium soap on account of its relative cheapness, but potassium soap and other soaps possessing some measure of solubility in water will give satisfactory results.

It should be clearly understood that the percentages of soap discussed in the foregoing refer to the emulsifying agent itself, not to the final emulsions or mixtures in which the emulsifying agent is used and in which the soap is present preferably in amounts not substantially greater than one per cent.

Although the present application is concerned with the emulsifying agent as such, our invention may be the better understood by further and more specific reference to a mixture in which the emulsifying agent may be used.

As an example, 17 parts mineral oil, 76 parts water, 7 parts monostearin, and 0.05 part sodium stearate, after being mixed together in molten condition and cooled, form a cream which is stable under practical conditions of storage, whereas the same mixture without the soap is likely to show separation. This corresponds to approximately 0.7% soap in the emulsifying agent itself. The stabilizing action of so small an amount of soap as a supplement to superglycerinated fat is considerably greater than would be predicted by separate study of the stabilizing effect of soap on mixtures of oil and water without superglycerinated fat.

Use of our emulsifying agent is especially beneficial in cosmetic creams, which are the subject of our copending application, Serial No. 384,241, filed August 7, 1929. However, it can be used to advantage for the stabilizing of other mixtures of oil with water, with water solutions, or with nonaqueous liquids such as glycerin which are miscible with water but not with oil.

An emulsifying agent essentially similar to that which we have already described may be obtained by substituting other polyhydric alcohols in whole or in part for the glycerin. The esters suitable for use in our invention have as their common element of structure unesterified hydroxyl groups, the proportion of combined fatty acid in such esters being insufficient to esterify all the hydroxyl groups of the combined polyhydric alcohol. On account of availability at the present time, we refer particularly, although not exclusively, to ethylene glycol.

Having thus described our invention, what we claim as new and desire to secure by Letters Patent, is:

1. A composition of matter comprising polyhydric alcohol incompletely esterified with fatty acid of high molecular weight and water-soluble soap, in proportions of 90 per cent to 99½ per cent incompletely esterified polyhydric alcohol to 10 per cent to ½ per cent soap.

2. As a new composition of matter a superglycerinated fat containing water-soluble soap in amounts between ½ per cent and 10 per cent by weight of the composition.

3. The composition of matter claimed in claim 2 in which saturated superglycerinated fat predominates.

4. The composition of matter claimed in claim 2 in which superglycerinated fat is derived from hydrogenated fat.

5. As a new composition of matter a superglycerinated fat containing sodium soap in amounts between ½ per cent and 10 per cent by weight of the composition.

6. A new composition of matter comprising 90 per cent to 99½ per cent monoglyceride of hydrogenated fat and 10 per cent to ½ per cent sodium soap.

7. A composition of matter for use in producing emulsions with water and with aqueous solutions of suitable substances comprising superglycerinated fat of solid to waxlike consistency, and ½ per cent to 10 per cent of water-soluble soap in proportion to 99½ per cent to 90 per cent of said superglycerinated fat.

8. A composition of matter of wax-like consistency for use in producing emulsions with water and with aqueous solutions of suitable substances comprising polyhydric alcohol incompletely esterified with fatty acid of high molecular weight and a quantity of water-soluble soap sufficient to increase materially the stability of emulsions produced with said composition but not substantially exceeding 10 per cent based on the weight of the partially esterified polyhydric alcohol.

9. A composition of matter of wax-like consistency for use in producing emulsions with water and with aqueous solutions of suitable substances comprising superglycerinated fat derived from hydrogenated fat and a quantity of water-soluble soap sufficient to increase materially the stability of emulsions produced with said superglycerinated fat but not substantially exceeding 10 per cent based on the weight of said superglycerinated fat.

WILLIAM F. SCHANZLE.
ALBERT S. RICHARDSON.